United States Patent
Nishimizu et al.

(10) Patent No.: US 9,689,660 B2
(45) Date of Patent: Jun. 27, 2017

(54) METHOD AND DEVICE FOR MONITORING STATUS OF TURBINE BLADES

(71) Applicant: Mitsubishi Hitachi Power Systems, Ltd., Yokohama, Kanagawa (JP)

(72) Inventors: Akira Nishimizu, Tokyo (JP); Toshiyuki Hiraoka, Yokohama (JP); Masahiro Tooma, Tokyo (JP); Soushi Narishige, Tokyo (JP); Tetsuya Matsui, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 258 days.

(21) Appl. No.: 14/316,393

(22) Filed: Jun. 26, 2014

(65) Prior Publication Data

US 2015/0002143 A1 Jan. 1, 2015

(30) Foreign Application Priority Data

Jun. 28, 2013 (JP) ................. 2013-135741

(51) Int. Cl.
  *G01B 7/30* (2006.01)
  *G01B 7/16* (2006.01)
  (Continued)

(52) U.S. Cl.
  CPC ................. *G01B 7/16* (2013.01); *G04C 5/00* (2013.01); *H02K 49/102* (2013.01);
  (Continued)

(58) Field of Classification Search
  CPC ........ G04C 5/00; H02K 49/102; G01D 5/142; G01D 5/145; G01D 5/2033; G01D 5/2241;
  (Continued)

(56) References Cited

U.S. PATENT DOCUMENTS 4,518,917 A  5/1985  Oates et al.
4,887,468 A  12/1989  McKendree et al.
(Continued)

FOREIGN PATENT DOCUMENTS

JP  59-60006 A  4/1984
JP  1-56694 B2  12/1989
(Continued)

OTHER PUBLICATIONS

Japanese Office Action issued in counterpart Japanese Application No. 2013-135741 dated Mar. 21, 2017 with unverified English translation (eight pages).

*Primary Examiner* — Huy Q Phan
*Assistant Examiner* — Raul Rios Russo
(74) *Attorney, Agent, or Firm* — Crowell & Moring LLP

(57) ABSTRACT

An object of this invention is to sense a transient displacement of the blade position to thereby detect abnormalities early. The invention includes: one or more first sensors mounted so as to be removable from an outer surface of a casing opposed to blade tips; a second sensor for acquiring a signal from a fixed point on a rotor shaft of the blades; a section configured to extract data groups from an output signal of the first sensor on the basis of information acquired by the second sensor; a section configured to average the data groups; a section configured to determine thresholds from averaged data obtained under a healthy condition; and an assessing section configured to compare magnitude of the thresholds and sensor signals obtained during blade status monitoring. Since a transient displacement of blade position can be sensed, abnormalities can be detected early in this invention. This early detection, in turn, enables a rotation to be stopped during an initial phase of blade damage. The invention is therefore advantageous in minimizing impacts on other devices.

3 Claims, 7 Drawing Sheets

(51) Int. Cl.
  *G04C 5/00* (2006.01)
  *H02K 49/10* (2006.01)
  *F01D 21/00* (2006.01)

(52) U.S. Cl.
  CPC .. *F01D 21/003* (2013.01); *G05B 2219/37124* (2013.01); *G05B 2219/37185* (2013.01)

(58) Field of Classification Search
  CPC ........... G05B 2219/37124; G05B 2219/37185; G05G 2009/04755
  USPC ..... 324/51, 55, 200, 207.11, 207.25; 341/15
  See application file for complete search history.

(56) References Cited

U.S. PATENT DOCUMENTS

| | | | |
|---|---|---|---|
| 2006/0122798 A1* | 6/2006 | Teolis | G01M 15/14 702/66 |
| 2009/0246019 A1* | 10/2009 | Volanthen | F03D 17/00 416/1 |
| 2009/0301055 A1* | 12/2009 | Kallappa | F01D 21/003 60/39.091 |
| 2010/0110450 A1 | 5/2010 | Corn et al. | |
| 2012/0035861 A1* | 2/2012 | Hadley | F01D 21/003 702/34 |
| 2012/0330606 A1 | 12/2012 | Whitefield, II | |
| 2013/0111982 A1 | 5/2013 | Batzinger et al. | |
| 2014/0369833 A1* | 12/2014 | Yu | F01D 11/14 416/1 |

FOREIGN PATENT DOCUMENTS

| | | |
|---|---|---|
| JP | 2-27103 A | 1/1990 |
| JP | 9-310604 A | 12/1997 |
| JP | 2000-321122 A | 11/2000 |
| JP | 2010-106836 A | 5/2010 |
| JP | 2013-3148 A | 1/2013 |
| JP | 2013-96989 A | 5/2013 |

\* cited by examiner

Threshold determination method

METHOD AND DEVICE FOR MONITORING STATUS OF TURBINE BLADES

BACKGROUND OF THE INVENTION

1. Field of the Invention

The present invention relates to a method and device for monitoring status of turbine blades.

2. Description of the Related Art

Steam turbines and gas turbines include a rotor, a disk coupled to the rotor and having a large number of blades, and a casing configured to store these elements. In a steam turbine, for example, rotational force is generated by conducting steam toward the blades. This force rotates the rotor at a high speed and activates a rotor-coupled power generator to generate electricity. The turbine includes a sensor disposed on or in a vicinity of a rotor bearing portion to monitor status of the turbine, the sensor being for measuring shaft displacement. This sensor, intended to monitor abnormality of devices, is a vital sensor for confirming normal turbine operation.

SUMMARY OF THE INVENTION

The above sensor disposed on or in the vicinity of the rotor bearing portion, which is for measuring shaft displacement, detects rotational abnormalities of the shaft. The abnormalities here include an imbalance of the rotating shaft, that is, a shift in a gravity center of the entire rotor due to a variation in mass, weight, or the like of the blades. The shift in the gravity center is considered to be also attributed to abnormal blade vibration during turbine operation. Early detection of these abnormalities associated with the blades is crucial in view of keeping normal turbine operation. In general, a sensor that measures shaft displacement is disposed on or in the vicinity of a rotor bearing portion. There is a problem, however, in that detection sensitivity of the sensor decreases depending on the degree of blade vibration.

In connection with this problem, JP-09-310604-A proposes a method and device for directly measuring blade vibration using a laser-light-aided sensor mounted on a casing portion close to the blades to measure a resonance frequency of blades. However, since steam turbines requires measurement under a steam atmosphere, the laser-light-aided sensor is affected by the steam and thus decreases in sensitivity. Also, it is necessary for the detection of abnormal blade vibration to sense a transient state. Accordingly the technique proposed in JP-09-310604-A is considered not to suffice for detecting the abnormal blade vibration. An object of the present invention is to sense a transient displacement of the blade position to thereby detect abnormalities early.

An aspect of the present invention includes: one or more first sensors mounted so as to be removable from an outer surface of a casing opposed to blade tips; a second sensor for acquiring a signal from a fixed point on a rotor shaft of the blades; a section configured to extract data groups from an output signal of the first sensor on the basis of information acquired by the second sensor; a section configured to average the data groups; a section configured to determine thresholds from averaged data obtained under a healthy condition; and an assessing section configured to compare magnitude of the thresholds and sensor signals obtained during blade status monitoring.

Since a transient displacement of blade position can be sensed in the present invention, abnormalities can be detected early. This early detection, in turn, enables a rotation to be stopped during an initial phase of blade damage. The invention is accordingly advantageous in minimizing impacts on other devices.

DESCRIPTION OF THE PREFERRED EMBODIMENTS

Hereinafter, embodiments of the present invention will be described.

First Embodiment

Figure 1:
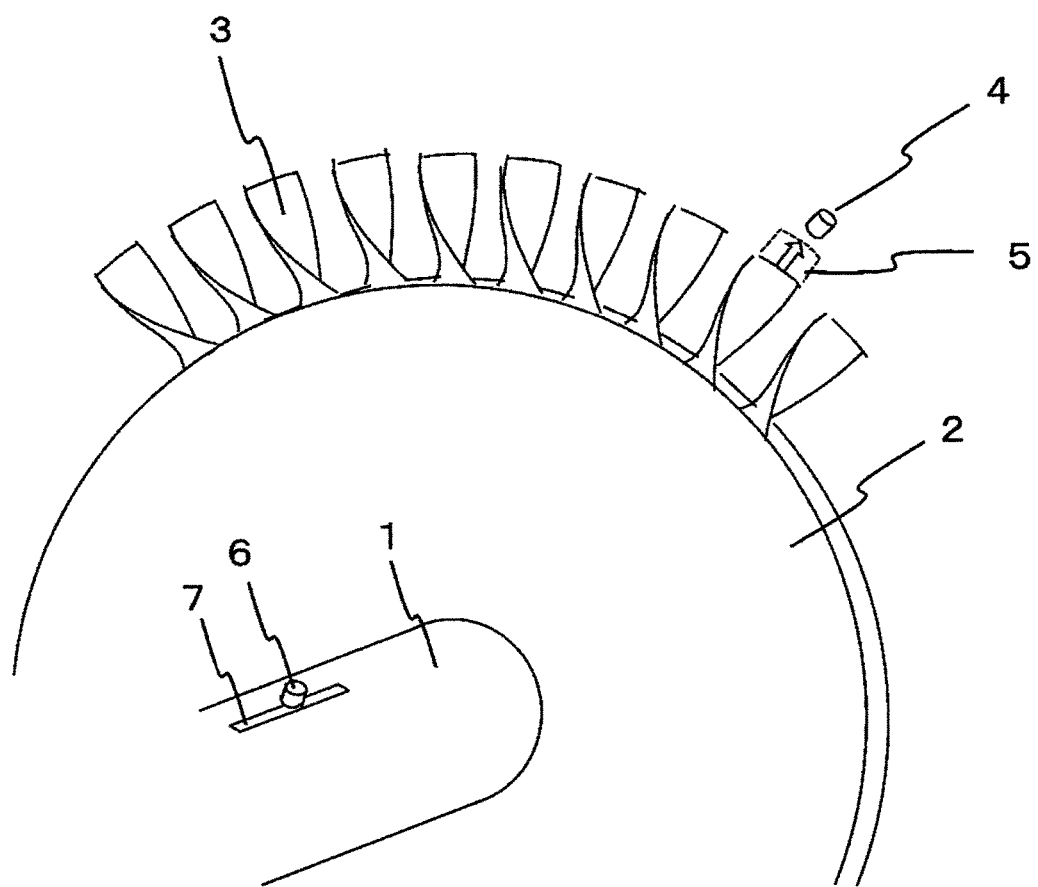
FIG. 1 is an explanatory diagram showing positions of sensors in a first embodiment.

A turbine structure and blade damage will first be described below with reference to FIG. 1. The turbine includes: a rotor shaft 1; a disk 2 for mounting a plurality of blades 3 thereupon; the blades 3 arranged along an outer circumferential portion of the disk 2; and a casing (not shown) covering the rotor shaft 1, the disk 2, and the blades 3. Impacts of damage to the blades 3 may appear in the form of an event that a centrifugal force resulting from rotation elongates the blades 3 in a radial direction of the disk 2 more significantly than initially assumed or that the blades is displaced in an axial direction by instability of the rotation. Accordingly, a first embodiment relates to a device that measures the elongation 5 of the blades 3.

In order to measure the elongation 5 of the blades 3, the device of the present embodiment includes one or more first sensors 4 mounted so as to be removable from the outer surface of the casing opposed to blade tips. The device also includes a second sensor 6 that acquires a signal from a fixed point on the rotor shaft 1 of the blades 3. For example, disposing a marker 7 at one place on the rotor shaft 1 enables the second sensor 6 to obtain the signal from the fixed point on the rotor shaft 1. The second sensor 6 acquires information on a rotational period of the rotor shaft 1. The information is used to extract data corresponding to one rotation from an output signal of the first sensor 4. The first sensor 4 and the second sensor 6 can be sensors of a magnetic field type or an eddy-current type. Data measured by the first sensor 4 and the second sensor 6 is used to detect abnormalities in accordance with a flow diagram shown in FIG. 2. The output signals of the sensors 4, 6 are sampled by an analog-to-digital converter 10.

Figure 2:
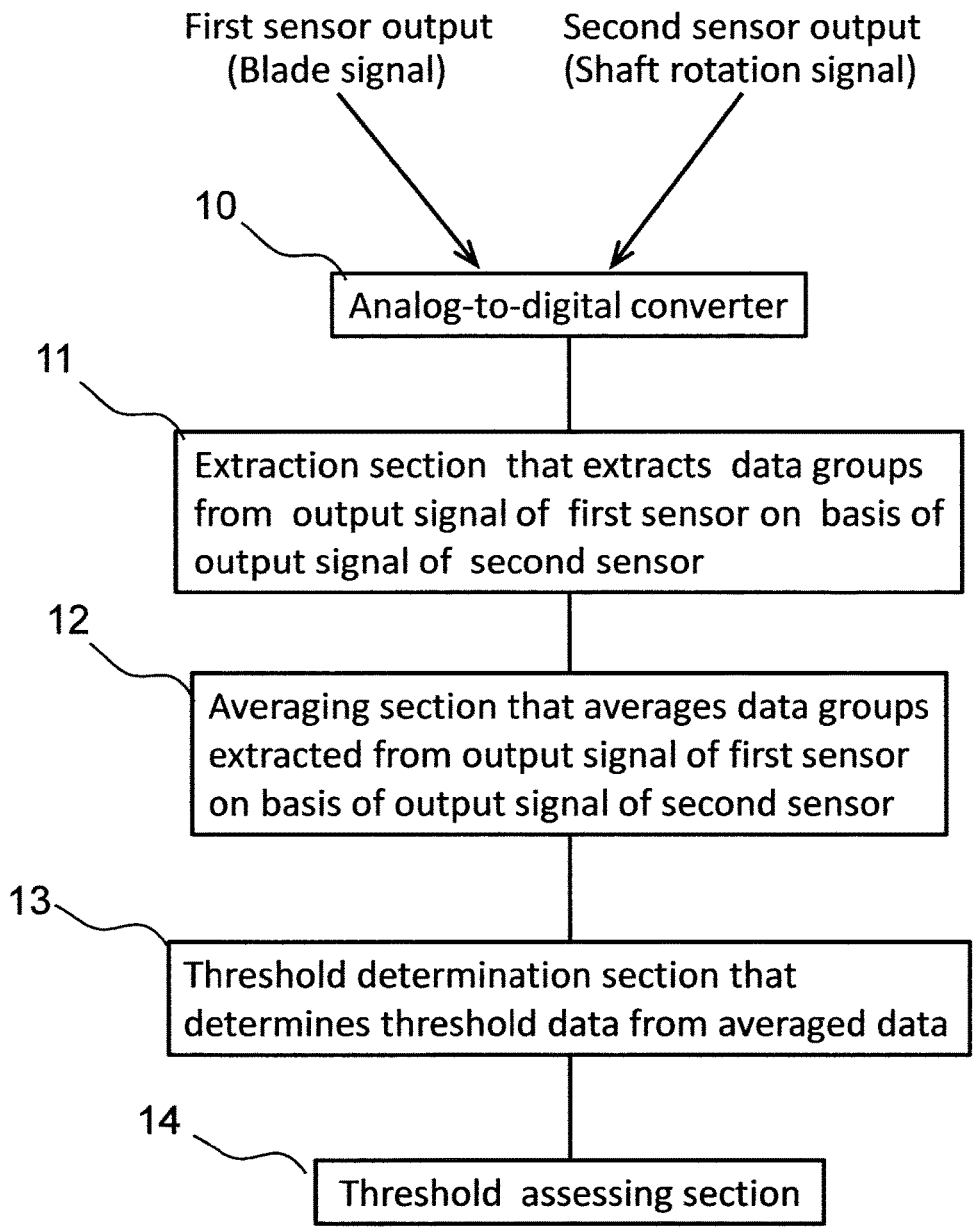
FIG. 2 is an explanatory diagram showing the configuration of the first embodiment.

FIG. 2 shows the flow diagram relating to processing of the output data from the first sensor 4 and the second sensor 6. An extraction section 11 that extracts data groups from the output signal of the first sensor 4 on the basis of the output signal of the second sensor 6 extracts a data group corresponding to one rotation of the rotor shaft 1. An averaging section 12 that averages the data groups extracted from the output signal of the first sensor 4 on the basis of the output signal of the second sensor 6 generates an averaged waveform. A threshold determination section 13 that determines thresholds from the averaged waveform obtained at a rated rotor speed under a healthy condition generates a threshold database for each blade. During turbine operation that follows the above, substantially the same operation sequence as the above is executed to obtain a measurement database during blade status monitoring and a threshold assessing section 14 successively compares the measurement database obtained during blade status monitoring with the threshold database for each blade 3 determined by the threshold determination section 13 that determines the thresholds from the averaged waveform obtained at the rated rotor speed under the healthy condition.

The above will be described in further detail below with reference to FIGS. 3 to 6.

Figure 3:
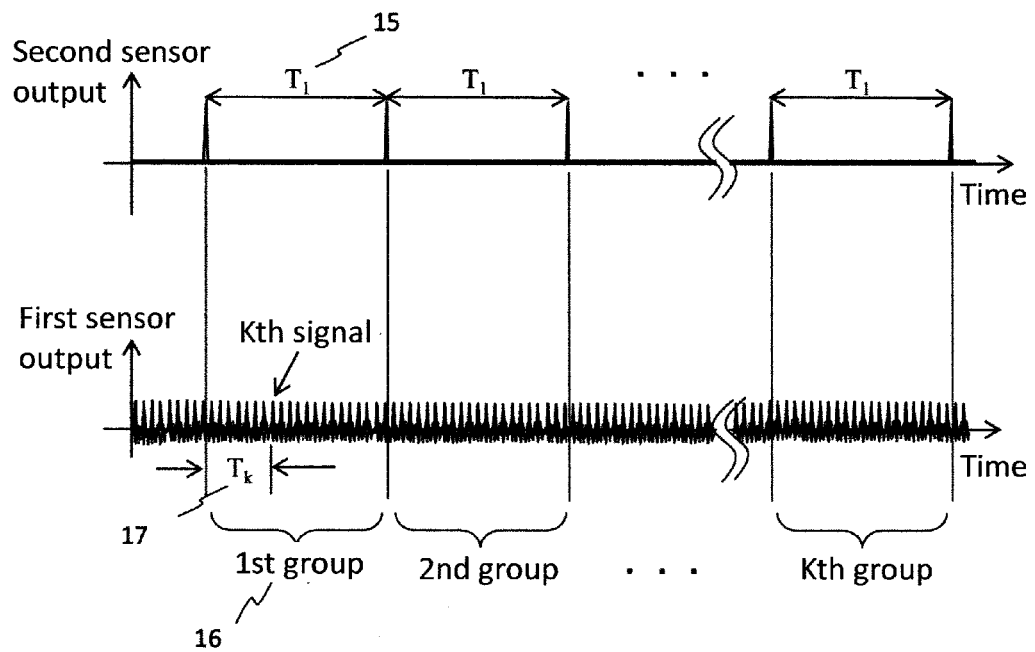
FIG. 3 is an explanatory diagram showing output signals of the sensors in the first embodiment.

FIG. 3 is an explanatory diagram of the extraction section 11 that extracts the data groups from the output signal of the first sensor 4 on the basis of the output signal of the second sensor 6. An upper waveform in FIG. 3 denotes the output signal of the second sensor 6, and a lower waveform denotes the output signal of the first sensor 4. The output signal of the second sensor 6 is obtained from the marker 7 provided at the fixed point on the rotor shaft 1 of the blades 3. Signal intervals $T_1$ 15 in the upper waveform correspond to the time of one rotation of the rotor shaft 1. Time-series data 16 corresponding to one rotation of the blade 3 is obtained as a result of extracting the part of the output signal of the first sensor 4 that corresponds to a signal generation time of the second sensor 6 and the signal interval $T_1$ 15. The time-series data 16 is formed from signals corresponding to the number of the blades 3. For example, each signal generated in the first sensor 4 can be associated with each blade 3 by calculating a time difference $T_K$ 17 between the signal generation time of the second sensor 6 and the time of the each signal generated in the first sensor 4. The data groups from a first group to a Kth group can be extracted in this way. The number of groups is determined in advance, for example, in accordance with a particular noise level of the data.

Figure 4:
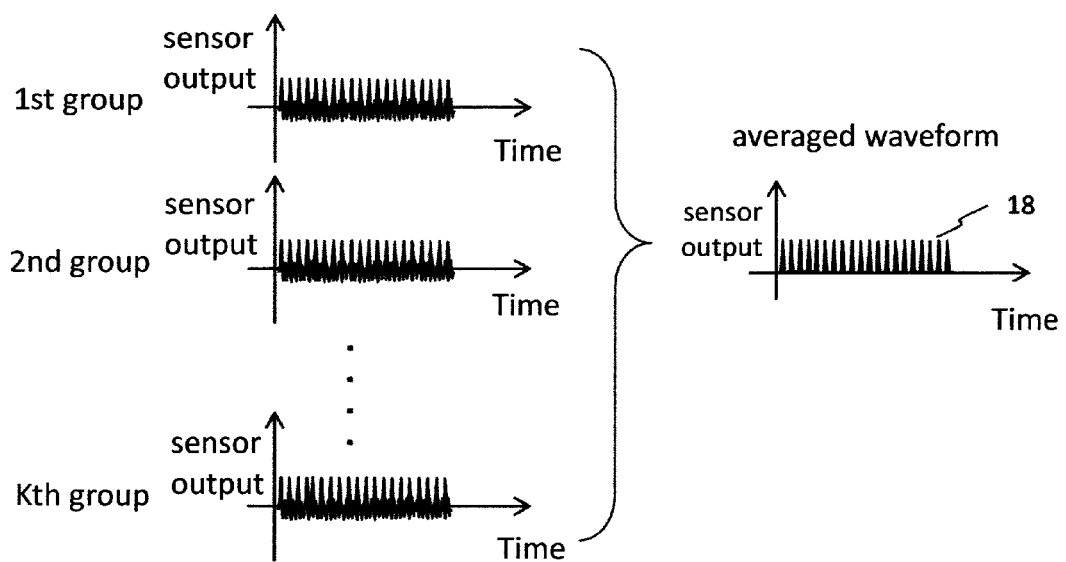
FIG. 4 is an explanatory diagram relating to averaging of data groups extracted from the sensor output signals in the first embodiment.

FIG. 4 is an explanatory diagram of the averaging section 12 that averages the data groups extracted from the output signal of the first sensor 4 on the basis of the output signal of the second sensor 6. Since first data in each of the data groups from the first group to the Kth group always corresponds to the same blade, the data groups are averaged as the time-series data including the first data in the first position. Thus a new data group 18 is calculated. The data group 18 is data in which noise generated in a random fashion is reduced.

Figure 5:
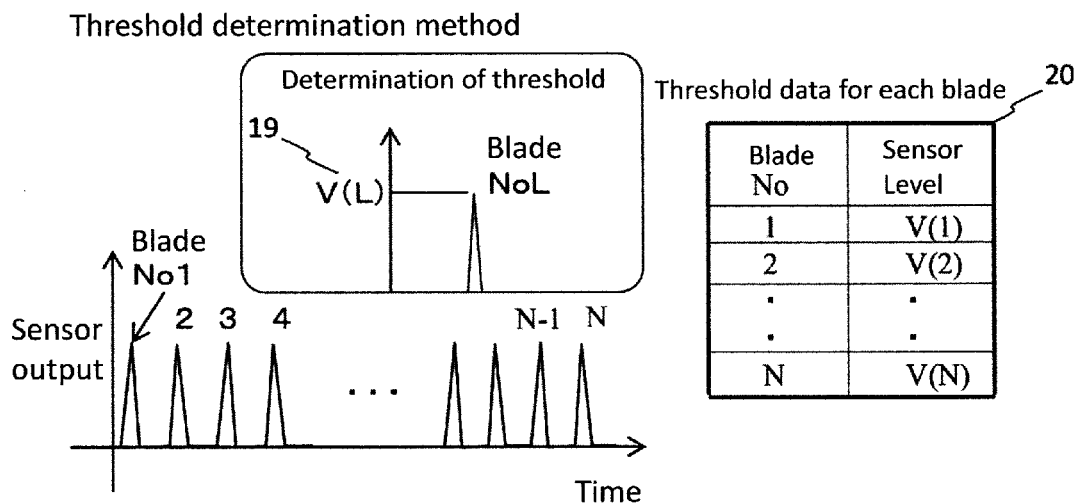
FIG. 5 is an explanatory diagram relating to determination of threshold data on the basis of an averaged waveform in the first embodiment.

FIG. 5 is an explanatory diagram of the threshold determination section 13 that determines the thresholds from the averaged waveform obtained at the rated rotor speed under the healthy condition. Sensor outputs on a blade-by-blade basis of the new data group 18 calculated from averaging the data groups are saved in a computer as threshold data 20. For example, a peak value V (L) 19 is calculated according to a waveform corresponding to blade No. L shown in FIG. 5, and the calculated value is taken as a threshold for blade No. L. Alternatively, a value of $\alpha$ that is determined depending on variation of the thresholds or blade elongation amount that needs to be managed may be incorporated into the above calculation and the blade elongation amount may be managed with a value obtained by adding the $\alpha$ value to or subtracting the $\alpha$ value from the threshold data 20.

Figure 6:
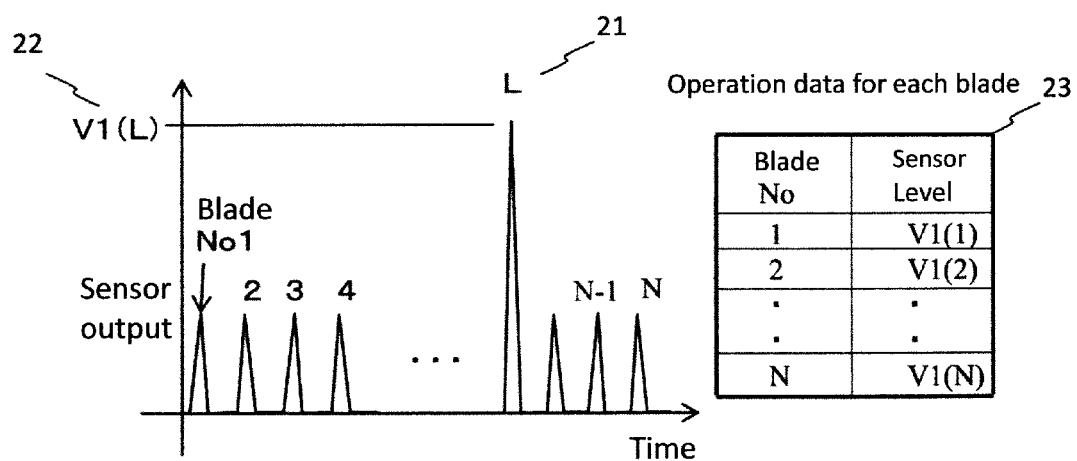
FIG. 6 is an explanatory diagram relating to operation data in breakage of a blade in the first embodiment.

FIG. 6 is an explanatory diagram of the threshold assessing section 14. The threshold assessing section 14 assesses by comparing measurement data with the threshold data 20 or the value obtained by adding to or subtracting from the threshold data 20 the $\alpha$ value determined on the basis of the variation of the thresholds or the blade elongation amount that needs to be managed. For example, an output signal of the first sensor 4 obtained during turbine operation is used to extract data groups and average the data groups in substantially the same manner as that described above and operation data 23 corresponding to each blade 3 is successively generated. The threshold assessing section 14 assesses differences between the operation data 23 and the threshold data 20. An example shown in FIG. 6 indicates that the sensor output level for blade No. L is V1 (L) 22, which has a difference relative to a threshold for blade No. L of the threshold data 20. In this example, a measure is taken to stop turbine operation.

As described above, the device includes: one or more first sensors 4 mounted so as to be removable from the outer surface of the casing opposed to blade tips; the second sensor 6 for acquiring a signal from the fixed point on the rotor shaft 1 of the blades 3; the extraction section 11 configured to extract data groups from the output signal of the first sensor 4 on the basis of information acquired by the second sensor 6; the averaging section 12 configured to average the data groups; the threshold determination section 13 configured to determine thresholds from the averaged data obtained under the healthy condition; and the threshold assessing section 14 configured to compare magnitude of the thresholds and sensor signals obtained during blade status monitoring. Such a structure makes it possible to sense a transient displacement of blade position and detect abnormalities early. This early detection, in turn, enables the rotation to be stopped during an initial phase of blade damage. The present invention is therefore advantageous in minimizing impacts on other devices.

Second Embodiment

A second embodiment will now be described below. The present embodiment relates to frequency analysis of averaged data. Data measured by the first sensor 4 and the second sensor 6 is used to detect abnormalities in accordance with a flow diagram shown in FIG. 7. Output signals of the sensors 4, 6 are sampled by an analog-to-digital converter 30.

Figure 7:
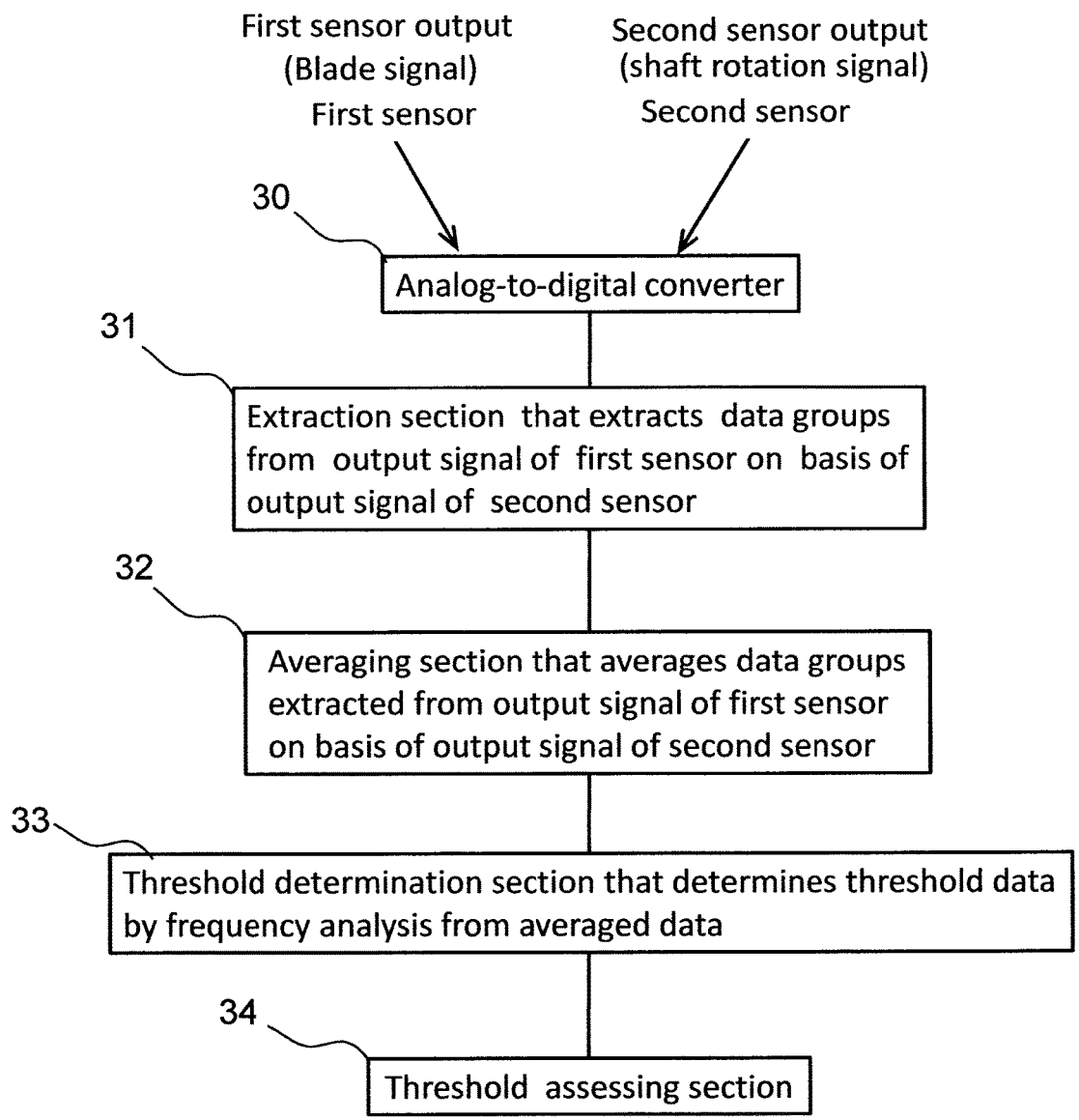
FIG. 7 is an explanatory diagram showing the configuration of a second embodiment.

With reference to FIG. 7, An extraction section 31 that extracts data groups from the output signal of the first sensor 4 on the basis of the output signal of the second sensor 6 extracts a data group corresponding to one rotation of the rotor shaft 1. An averaging section 32 that averages the data groups extracted from the output signal of the first sensor 4 on the basis of the output signal of the second sensor 6 generates an averaged waveform. A threshold determination section 33 that determines thresholds by frequency analysis from the averaged data obtained at a rated rotor speed under a healthy condition generates a threshold database on a blade-by-blade basis. During turbine operation that follows the above, substantially the same operation sequence as the above is executed to obtain a measurement database during blade status monitoring and a threshold assessing section 34 successively compares the measurement database obtained during blade status monitoring with the threshold database determined in accordance with the frequency analytical results obtained at the rated rotor speed under the healthy condition.

Figure 8:
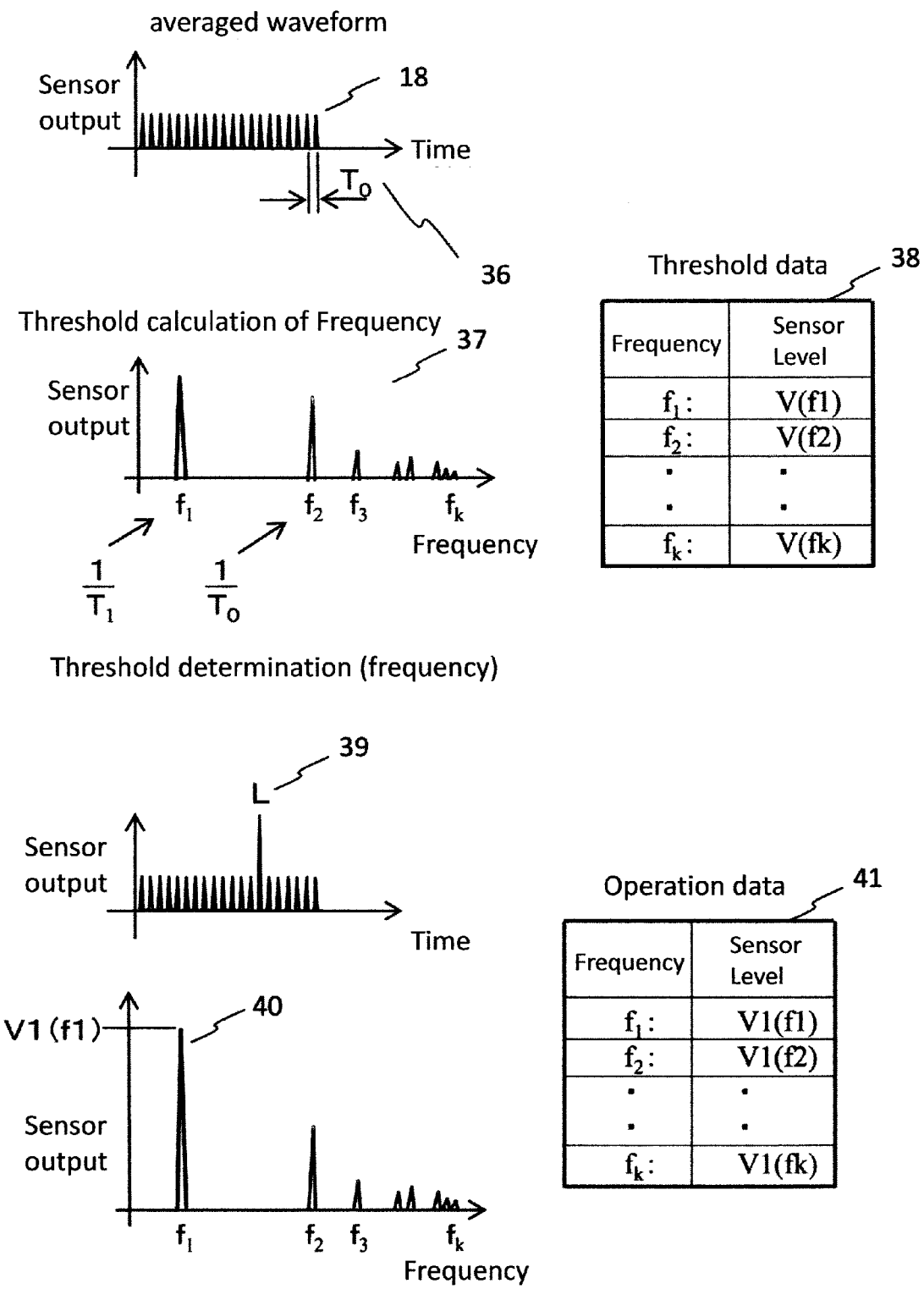
FIG. 8 is an explanatory diagram relating to determination of threshold data in the second embodiment.
Figure 9:
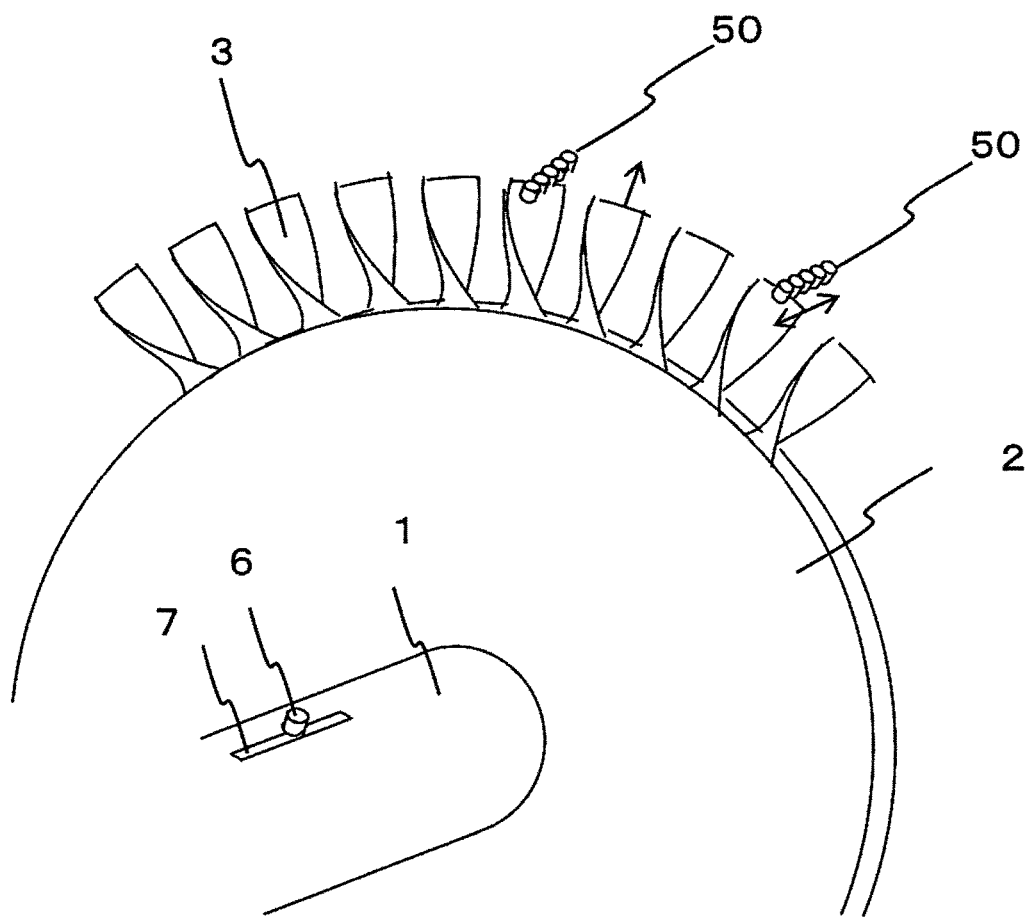
FIG. 9 is an explanatory diagram showing positions of sensors in a third embodiment.

FIG. 8 is an explanatory diagram showing an example of analyzing frequency components from the averaged waveform 18 to generate threshold data. The averaged waveform 18 is subjected to the frequency analysis by way of high-speed Fourier transformation or the like in the first step. This analysis results in a characteristic graph 37 whose horizontal axis indicates frequency. A frequency component of $1/T_1$ (shown as "$f_1$" in FIG. 8) that is an inverse of the signal interval $T_1$ of the second sensor 6 and a frequency component of $1/T_o$ (shown as "$f_2$" in FIG. 8) that is an inverse of a signal interval $T_0$ 36 between blade signals of the averaged waveform are mainly generated as results of the frequency analysis. In addition to these components, vibration components of the blades 3 and noise components are generated as "$f_3$" to "$f_k$" components. The sensor output signal levels corresponding to these frequency components are saved as threshold data 38 in a computer. Then, the threshold data 38 is compared with a measurement database obtained during blade status monitoring. For example, if one blade (blade No. L 39 in the example of FIG. 8) elongates, the elongation is detected as an increase in the signal level of the "$f_1$" component. If two or three blades elongate, the signal level of the "$f_1$" component increases or a signal of a new frequency component between "$f_1$" and "$f_2$" is generated. Such abnormalities can be detected by assessing differences between the operation data 41 and the threshold data 38 in the manner above. After the detection of an abnormality, a measure is taken to stop turbine operation.

Third Embodiment

A third embodiment uses a sensor device 50 having a structure with a plurality of first sensors arrayed in an axial direction. Blade abnormalities can be detected by acquiring output signals from the first sensors and independently processing these signals in substantially the same manner as that of processing an output signal from first sensor 4. The use of the sensor device 50 including the axially arrayed first sensors enables extension of a sensing region of the sensor, making it possible to detect the abnormalities even if axial positions of the blades 3 are displaced due to elongation.

What is claimed is:

1. A device for monitoring status of turbine blades, the device comprising:
   one or more first sensors mounted so as to be removable from an outer surface of a casing opposed to blade tips;
   a second sensor for acquiring a signal from a fixed point on a rotor shaft of the blades;
   a section configured to extract data groups from an output signal of the first sensor on the basis of information acquired by the second sensor;
   a section configured to average the data groups;
   a section configured to determine thresholds from averaged data obtained under a healthy condition; and
   an assessing section configured to compare magnitude of the thresholds and sensor signals obtained during blade status monitoring,
   wherein the section configured to determine the thresholds from the averaged data obtained under the healthy condition analyzes a frequency component of an averaged time-series signal and extracts, as thresholds, signal intensities of frequencies: a frequency "$f_1$" corresponding to an inverse of a signal interval obtained from the second sensor, a frequency "$f_2$" corresponding to an inverse of a blade-by-blade pulse signal interval of the averaged time-series signal, and a frequency component between "$f_1$" and "$f_2$", and
   wherein the assessing section configured to compare the magnitude of the thresholds and the sensor signals obtained during blade status monitoring compares magnitude of signal intensities of the frequencies.

2. The device for monitoring the status of the turbine blades according to claim 1, comprising as the first sensor and the second sensor:
   sensors of at least one of a magnetic field type and an eddy-current type.

3. A method for monitoring status of blades involved in a turbine, the turbine comprising:
   one or more first sensors mounted so as to be removable from an outer surface of a casing opposed to blade tips, and
   a second sensor for acquiring a signal from a fixed point on a rotor shaft of the blades, the method comprising the step of:
   extracting data groups from an output signal of the first sensor on the basis of information acquired by the second sensor;
   averaging the data groups;
   determining thresholds from averaged data obtained under a healthy condition; and
   comparing magnitude of the thresholds and sensor signals obtained during blade status monitoring,
   wherein the step of determining the thresholds is the step of analyzing a frequency component of an averaged time-series signal and extracting, as thresholds, signal intensities of frequencies: a frequency "f1" corresponding to an inverse of a signal interval obtained from the second sensor, a frequency "f2" corresponding to an inverse of a blade-by-blade pulse signal interval of the averaged time-series signal, and a frequency component between "f1" and "f2," and
   wherein the step of comparing magnitude of the thresholds and sensor signals obtained during blade status monitoring is the step of comparing magnitude of signal intensities of the frequencies.

\* \* \* \* \*